US012559666B2

(12) United States Patent

Belakshe et al.

(10) Patent No.: US 12,559,666 B2
(45) Date of Patent: Feb. 24, 2026

(54) FILTER CAKE REMOVAL COMPOSITIONS AND RELATED WELLBORE METHODS

(71) Applicant: Halliburton Energy Services, Inc., Houston, TX (US)

(72) Inventors: Ravikant S. Belakshe, Pune (IN); Sumit Ramesh Songire, Pune (IN); Sunita Sameer Kadam, Pune (IN); Pratiksha Sharma, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/741,423

(22) Filed: Jun. 12, 2024

(65) Prior Publication Data

US 2025/0382517 A1 Dec. 18, 2025

(51) Int. Cl.
*C09K 8/528* (2006.01)
*E21B 37/06* (2006.01)

(52) U.S. Cl.
CPC .............. *C09K 8/528* (2013.01); *E21B 37/06* (2013.01); *E21B 2200/08* (2020.05)

(58) Field of Classification Search
CPC ............ C09K 8/52; C09K 8/528; C09K 8/72; E21B 37/00; E21B 21/003; E21B 37/06; E21B 43/25
See application file for complete search history.

(56) References Cited

U.S. PATENT DOCUMENTS

| | | | |
|---|---|---|---|
| 7,159,658 B2 | 1/2007 | Frost et al. | |
| 7,928,040 B2 | 4/2011 | Sanders et al. | |
| 8,881,823 B2 | 11/2014 | Collins et al. | |
| 9,758,714 B2 | 9/2017 | Belakshe et al. | |
| 9,890,321 B2 | 2/2018 | Shumway | |
| 10,161,223 B2 | 12/2018 | Zhou et al. | |
| 10,309,172 B2 | 6/2019 | Van Petegem et al. | |
| 10,329,478 B2 | 6/2019 | Schnoor et al. | |
| 10,550,319 B2 | 2/2020 | Mcdaniel et al. | |
| 10,563,112 B2 | 2/2020 | Harris | |
| 11,078,402 B2 | 8/2021 | Offenbacher et al. | |
| 11,352,854 B2 | 6/2022 | Morrison et al. | |

(Continued)

FOREIGN PATENT DOCUMENTS

| | | | | |
|---|---|---|---|---|
| CA | 2889135 A1 * | 5/2014 | ............... | C09K 8/74 |
| WO | 2020231400 A1 | 11/2020 | | |

OTHER PUBLICATIONS

Al-Taq et al., "First Successful Filtercake Damage Removal Treatment Utilizing In-situ Nitrogen/Heat Generating system for Relatively Heavy Oil Wells", Paper presented at the SPE Annual Technical Conference and Exhibition, Amsterdam, The Netherlands, Oct. 2014. doi: https://doi.org/10.2118/170832-MS, Oct. 27, 2014, 9 pages.

(Continued)

*Primary Examiner* — Zakiya W Bates
(74) *Attorney, Agent, or Firm* — Kilpatrick Townsend & Stockton LLP

(57) ABSTRACT

Compositions and methods for removing a filter cake from a wellbore may use a breaker that comprises an ester-based acid precursor and a lactone. A treatment fluid may contain an aqueous fluid and the breaker. A method may include introducing the treatment fluid into the wellbore, contacting the filter cake in the wellbore with the treatment fluid, and removing at least a portion of the filter cake.

14 Claims, 10 Drawing Sheets

(56) References Cited

U.S. PATENT DOCUMENTS

| | | | |
|---|---|---|---|
| 2008/0139416 A1* | 6/2008 | Rimassa ................ | C09K 8/508 |
| | | | 507/241 |
| 2010/0152069 A1 | 6/2010 | Harris | |
| 2010/0323932 A1 | 12/2010 | Bustos et al. | |
| 2014/0303047 A1 | 10/2014 | Mcdaniel et al. | |
| 2016/0130497 A1 | 5/2016 | Liu et al. | |
| 2016/0304765 A1* | 10/2016 | Kadam .................... | C09K 8/72 |
| 2020/0032135 A1 | 1/2020 | Zhou et al. | |
| 2021/0115319 A1 | 4/2021 | Santos et al. | |
| 2021/0396098 A1 | 12/2021 | Morrison et al. | |
| 2023/0151262 A1 | 5/2023 | Kuchik et al. | |

OTHER PUBLICATIONS

Baker Huges, "Micro-Wash DLA: Remove synthetic and oil-based filter cake and near-wellbore drilling fluid damage", Product Sheet, 2020, 2 pages.

Baker Hughes, "Mudzyme water-based drill-in fluid filter cake breaker", Product Sheet, 2020, 1 page.

Davidson, E. , et al., "New and Effective Filter Cake Removal Optimizes Water Injectivity", Paper presented at the SPE International Symposium and Exhibition on Formation Damage Control, Lafayette, Louisiana, USA, Feb. 2012. doi: https://doi.org/10.2118/151683-MS, Feb. 15, 2012, 11 pages.

Halliburton Energy Services, Inc , "N-Flow 325 Filter Cake Breaker", Product Sheet, Mar. 2020, 1 page.

Halliburton Energy Services, Inc , "PowerSafe-D-Solve™ Agent", Product Sheet, 2011, 1 page.

M-I Swaco , "Mudsolving: Comprehensive filter-cake breaker service", Product Brochure, 2013, 12.

TBC-Brinadd, LLC , "Ultra Breake M", Product Sheet, available at https://www.tbc-brinadd.com/polymer-breakers-1/ultra-breake-m, at least as early as Apr. 15, 2024, 2 pages.

International Patent Application No. PCT/US2025/024881, International Search Report and Written Opinion mailed Aug. 5, 2025, 10 pages.

* cited by examiner

Perform a wellbore operation to form a filter cake in a wellbore
10

Introduce a treatment fluid with a breaker into the wellbore
20

Contact filter cake with treatment fluid
30

Remove at least a portion of the filter cake
40

24 hours additional 24 hours 24 hours additional 24
hours 24 hours 24 hours 24 hours

FILTER CAKE REMOVAL COMPOSITIONS AND RELATED WELLBORE METHODS

TECHNICAL FIELD

The present disclosure relates generally to wellbore cleanup operations and, more particularly (although not necessarily exclusively), to compositions and methods for removing a filter cake from a wellbore.

BACKGROUND

Filter cakes, often containing salts, viscosifiers, and bridging agents, are residues deposited on the walls of a wellbore as a result of various subterranean operations such as drilling, completion, and work-over operations. A filter cake can reduce the permeability of a surface on which the filter cake has formed, which is useful for mitigating the flow of fluids and solids from the wellbore into the surrounding subterranean formation during drilling, completion, and work-over operations. However, to produce natural resources such as gas, oil, and water from a subterranean formation, the filter cake needs to be removed from the walls of the wellbore to restore permeability.

DETAILED DESCRIPTION

Certain aspects and examples of the present disclosure relate to breakers that contain an ester-based acid precursor and a lactone, where the lactone accelerates rate of hydrolysis of the ester-based acid precursor. Accordingly, acid may be generated faster in the wellbore, which may translate to a faster and more complete dissolution of a filter cake in wellbore.

Further, the lactone may generate acid at a temperature lower than the ester-based acid precursor hydrolyzes. The acid produced by the lactone decreases the pH and may initiate hydrolysis of the ester-based acid precursor at the lower temperature, which may include temperatures where the ester-based acid precursor alone would not hydrolyze on a timescale suitable for removal of a filter cake from a wellbore. Accordingly, the ester-based acid precursor may effectively remove a filter cake from a wellbore at a lower temperature than the ester-based acid precursor is currently effective.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
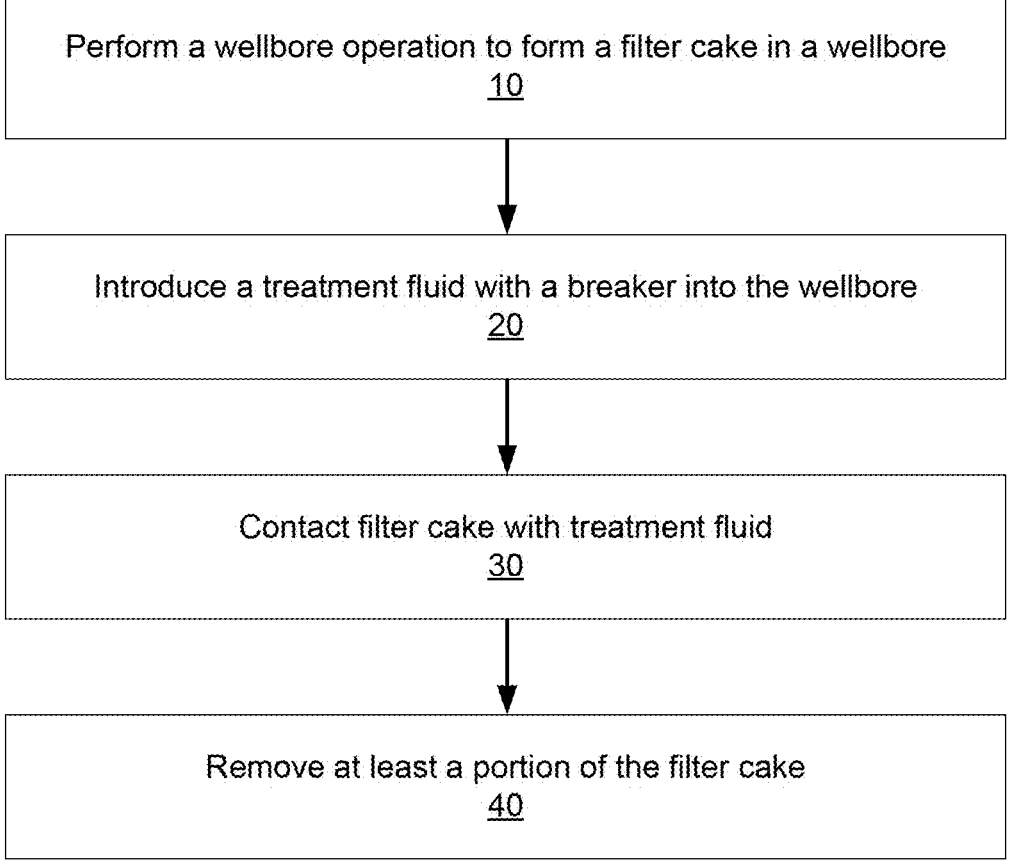
FIG. 1 is a flow diagram of a method according to one example of the present disclosure.

FIG. 1 is a flow diagram of a method according to one example of the present disclosure. At step 10, a drilling operation or another wellbore operation may be performed to form a filter cake on a surface of a wellbore penetrating a subterranean formation. At step 20, a treatment fluid containing a breaker, which comprises an ester-based acid precursor and a lactone, may be introduced to the wellbore. At step 30, the treatment fluid may then contact the filter cake. The lactone may generate an acid that may initiate, accelerate, or both the hydrolysis of the ester-based acid precursor. During hydrolysis, the ester-based acid precursor may produce lactic acid, formic acid, acetic acid, and the like. In some instances, the filter cake may include calcium carbonate, formate salts, or both that dissolve in the acid produced by the ester-based acid precursor and the lactone. Dissolution of such components of the filter cake may cause structural degradation of the filter cake and facilitate removal of at least a portion of the filter cake from the surface of the wellbore at step 40. The treatment fluid may convey the dissolved filter cake, the undissolved filter cake remnants, or both to the surface.

The wellbore temperature where the treatment fluid contacts the filter cake may range from about 15° C. to about 120° C., from about 15° C. to about 35° C., from about 25° C. to about 60° C., from about 50° C. to about 100° C., or from about 70° C. to about 120° C.

A rate of hydrolysis for the ester-based acid precursor may increase by at least about 5 times compared to the rate of hydrolysis for the ester-based acid precursor observed in an absence of the lactone at the temperature in which the treatment fluid contacts the filter cake. The amount of increase in the rate of hydrolysis may be at least about 5 times, at least about 10 times, at least about 20 times, from about 5 times to about 50 times, from about 10 times to about 50 times, or from about 20 times to about 50 times. The temperature at which the rate of hydrolysis is increased may be at about 15° C., about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., about 100° C., about 105° C., about 110° C., about 115° C., or about 120° C. For example, the rate of hydrolysis of diethylene glycol diformate at 15° C. in the presence of the lactone may be at least about 5 times, at least about 10 times, at least about 20 times, from about 5 times to about 50 times, from about 10 times to about 50 times, or from about 20 times to about 50 times than without the lactone present. In another example, the rate of hydrolysis of diethylene glycol diformate at 20° C. in the presence of the lactone may be at least about 5 times, at least about 10 times, at least about 20 times, from about 5 times to about 50 times, from about 10 times to about 50 times, or from about 20 times to about 50 times than without the lactone present. In another example, the rate of hydrolysis of diethylene glycol diformate at 25° C. in the presence of the lactone may be at least about 5 times, at least about 10 times, at least about 20 times, from about 5 times to about 50 times, from about 10 times to about 50 times, or from about 20 times to about 50 times than without the lactone present. In another example, the rate of hydrolysis of diethylene glycol diformate at 30° C. in the presence of the lactone may be at least about 5 times, at least about 10 times, at least about 20 times, from about 5 times to about 50 times, from about 10 times to about 50 times, or from about 20 times to about 50 times than without the lactone present. For example, the rate of hydrolysis of methyl lactate, ethyl lactate, or both at 85° C. in the presence of the lactone may be at least about 5 times, at least about 10 times, at least about 20 times, from about 5 times to about 50 times, from about 10 times to about 50 times, or from about 20 times to about 50 times than without the lactone present. In another example, the rate of hydrolysis of methyl lactate, ethyl lactate, or both at 90° C. in the presence of the lactone may be at least about 5 times, at least about 10 times, at least about 20 times, from about 5 times to about 50 times, from about 10 times to about 50 times, or from about 20 times to about 50 times than without the lactone present. In another example, the rate of hydrolysis of methyl lactate, ethyl lactate, or both at 95° C. in the presence of the lactone may be at least about 5 times, at least about 10 times, at least about 20 times, from about 5 times to about 50 times, from about 10 times to about 50 times, or from about 20 times to about 50 times than without the lactone present.

When experimentally determining the rate of hydrolysis, pH or spectroscopy may be used to measure the concentration of acid produced, which measured over time is used to calculate the rate of hydrolysis. The rate of filter cake dissolution provides an indication of the rate of hydrolysis. That is, faster filter cake dissolution indicates faster hydrolysis of the ester-based acid precursor.

The treatment fluids of the present disclosure for removing a filter cake may include an aqueous fluid and a breaker containing an ester-based acid precursor and a lactone. During hydrolysis, the ester-based acid precursor may produce lactic acid, formic acid, acetic acid, and the like.

Examples of ester-based acid precursors may include, but are not limited to, lactide, glyceryl diacetate, glyceryl triacetate, ethylene glycol monoformate, monoethylene glycol diformate, diethylene glycol diformate, glyceryl monoformate, glyceryl diformate, glyceryl triformate, triethylene glycol diformate, a formate ester of pentaerythritol, methyl lactate, ethyl lactate, propyl lactate, butyl lactate, polylactic acid, the like, and any combination thereof.

The ester-based acid precursor may be present in the treatment fluid in an amount ranging from about 5 vol/vol % to about 50 vol/vol %, from about 5 vol/vol % to about 30 vol/vol %, or from about 10 vol/vol % to about 25 vol/vol %, each based on a total volume of the treatment fluid. The vol/vol % is calculated as (L of ester-based acid precursor)/(L of treatment fluid)*100.

Lactones are organic heterocyclic compounds that consist of cyclic carboxylic esters and one or more heteroatoms (e.g., oxygen) replacing carbon atoms in the ring. Examples of lactones may include, but are not limited to, gluconolactone, glucoheptonic lactone, $\alpha$-acetolactone, $\beta$-propiolactone, $\gamma$-butyrolactone, $\delta$-valerolactone, $\varepsilon$-caprolactone, $\gamma$-decalactone, $\delta$-decalactone, $\gamma$-dodecalactone, $\gamma$-octalactone, $\gamma$-nonalactone, $\gamma$-undecalactone, ellagic acid (also known as, hexahydroxydiphenic acid dilactone), flavogallonic acid dilactone, tergallic acid dilactone, valoneic acid dilactone, ethylene brassylate, the like, and any combination thereof.

The lactone may be present in the treatment fluid in an amount ranging from about 0.005 kg/L to about 0.2 kg/L, from about 0.005 kg/L to about 0.15 kg/L, from about 0.005 kg/L to about 0.1 kg/L, from about 0.005 kg/L to about 0.05 kg/L, or from about 0.02 kg/L to about 0.04 kg/L, each based on a total volume of the treatment fluid.

A volume of ester-based acid precursor volume (in liters) present in the treatment fluid per 1 kilogram of lactone may range from about 2 L to about 20 L, from about 3 L to about 20 L, from about 5 L to about 20 L, from about 2 L to about 10 L, or from about 5 L to about 10 L.

The aqueous fluid in the treatment fluid may include fresh water, saltwater, seawater, brine containing inorganic or organic dissolved salt compounds, mixtures containing water-miscible organic compounds (e.g., an alcohol, a glycerol, a glycol, etc.), the like, and any combination thereof. For example, the aqueous fluid may be a brine that includes one or more of the following salts: $NaBr$, $CaCl_2$), $CaBr_2$, $ZnBr_2$, $KCl$, $NaCl$, sodium formate, calcium formate, zinc formate, cesium formate, and potassium formate.

The treatment fluid may have a density ranging from 8 pounds per gallon (ppg) (1 g/cm$^3$) to 15 ppg (1.8 g/cm$^3$), from 8 ppg (1 g/cm$^3$) to 13 ppg (1.6 g/cm$^3$), or from 8 ppg (1 g/cm$^3$) to 12 ppg (1.4 g/cm$^3$). One ppg is equivalent to 0.12 g/cm$^3$.

The treatment fluid when introduced to the wellbore may have a pH ranging from about 2 to about 5, or from about 3 to about 5, from about 2.5 to about 4, or from about 3 to about 4. Also, the pH of the treatment fluid can be adjusted using buffering agent depending on the desired rate of activation.

The treatment fluid may optionally include an additive. The additive may be used to adjust a property of the treatment fluid, for example, viscosity, density, and the like. Examples of additives may include, but are not limited to, silica scale control additives, corrosion inhibitors, surfactants, gel stabilizers, anti-oxidants, polymer degradation prevention additives, relative permeability modifiers, scale inhibitors, foaming agents, defoaming agents, antifoaming agents, emulsifying agents, de-emulsifying agents, iron control agents, proppants or other particulates, particulate diverters, salts, fluid loss control additives, gas, catalysts, clay control agents, dispersants, flocculants, scavengers

5

6

(e.g., H₂S scavengers, CO2 scavengers or O₂ scavengers), gelling agents, lubricants, friction reducers, bridging agents, viscosifiers, weighting agents, solubilizers, hydrate inhibitors, consolidating agents, bactericides, clay stabilizers, breakers, the like, or any combination thereof.

Figure 2:
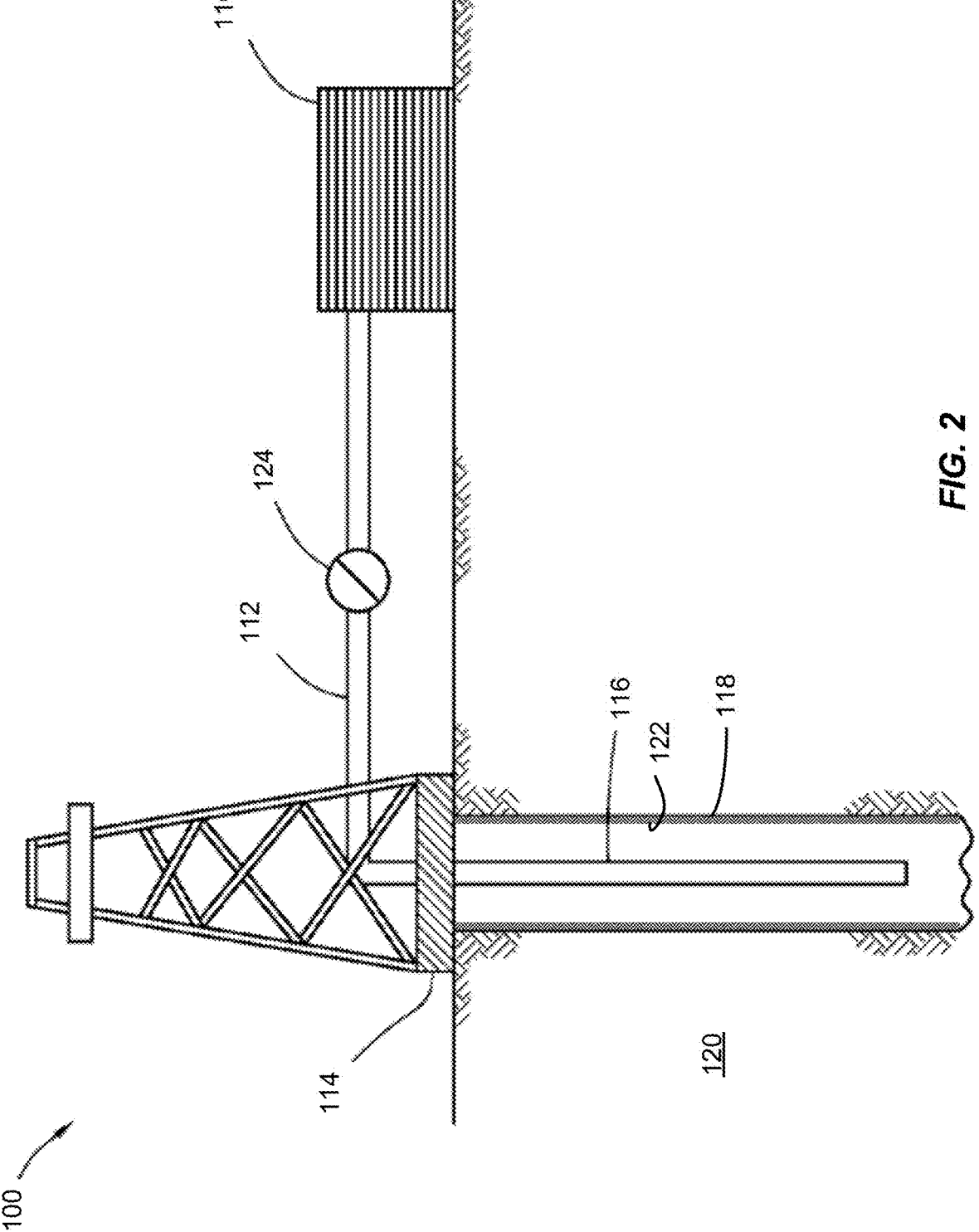
FIG. 2 is a schematic depiction of a system for using a treatment fluid according to one example of the present disclosure.

FIG. 2 shows an illustrative schematic of a system that can deliver treatment fluids of the present disclosure to a downhole location, according to one or more embodiments. It should be noted that while FIG. 2 generally depicts a land-based system, it is to be recognized that like systems may be operated in subsea locations as well. As depicted in FIG. 2, system 100 may include mixing tank 110, in which a treatment fluid of the present disclosure may be formulated. The treatment fluid may be conveyed via line 112 to wellhead 114, where the treatment fluid enters tubular 116, tubular 116 extending from wellhead 114 into a wellbore 118 penetrating a subterranean formation 120. Upon being cal, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

EXAMPLES

Mud. A mud sample was prepared having the composition described in Table 1, where lb/bbl indicates pounds per barrel (i.e., per 42 U.S. gallons). The products were mixed on multimixer to formulate the mud. The mud was fluid hot rolled at 240° F. for 16 hrs. The hot rolled mud used for filter cake formation and dissolution studies.

TABLE 1

| Component | Description | Concentration (lb/bbl) |
|---|---|---|
| Water | Base fluid | 301 |
| Sodium chloride | Salt | 60 |
| Xanthan polymer | Viscosifier | 0.75 |
| Modified starch | Fluid loss control agent | 6 |
| Magnesium oxide | Buffering agent | 0.75 |
| Sized calcium carbonate | Bridging agent | 45 |
| OXYGON ™, available from Halliburton | Oxygen scavenger | 0.5 | ejected from tubular 116, the treatment fluid enter the wellbore 118 and contact a filter cake 122 therein. In some instances, tubular 116 may have a plurality of orifices (not shown) through which the treatment fluid of the present disclosure may enter the wellbore proximal to a portion of the wellbore 118 to be treated.

Pump 124 may be configured to raise the pressure of the treatment fluid to a desired degree before its introduction into tubular 116. It is to be recognized that system 100 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the treatment fluid may, in some embodiments, flow back to wellhead 114 and exit wellbore 118.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electri- High Pressure Filter Cake Removal Test.

To prepare the filter cake, the ceramic disc was soaked in a test brine. Then, the excess brine was removed from the disc with the help of tissue paper placed appropriately in the high pressure cell. The mud (100 mL) was placed on top of the disc and the cell was closed. A differential pressure of 500 psi was applied across the disc in the high pressure cell, and the cell was heated or cooled to the test temperature. Once the test temperature was reached, the bottom valve of the cell was opened, and fluid was allowed to flow for a period of 1 hour under the differential pressure of 500 psi. The fluid loss was recorded with respect to time. At the end of 1 hour, the bottom valve was closed, and cell was brought to room temperature. The pressure was then released and the excess mud remaining in the cell was drained out. The cake was about 2 mm in thickness.

To perform a soak test at room temperature, no pressure was applied across the filter cake. The filter cake was soaked in the in the test breaker solution at different temperature for the prescribed time. To perform the soak test at elevated temperature 100 psi pressure applied. After bringing the cell to room temperature, the cell was opened, and the breaker sample was drained out. The status of the filter cake was noted, for example, whether the filter cake was cleaned from the face of the ceramic disc or not. If the filter cake was still intact, the breaker sample was loaded back in the cell and soaked further.

To perform a breakthrough test, the breaker sample (100 mL) was loaded over the filter cake, and the cell was closed. A differential pressure of 100 psi was maintained from top of the cell. The cell was brought to the test temperature, and then the bottom valve was opened. The fluid loss was recorded with respect to time. A sudden rapid increase in the amount of fluid loss was recorded as the breakthrough time.

Example 1. Breaker samples according to Table 2 were tested per the soak test at 25° C. where the status of the filter cake was assessed at 24 and 48 hours. The pH initially and at each filter cake assessment was recorded. The soak test results are provided in Table 2.

TABLE 2

Figure 3:
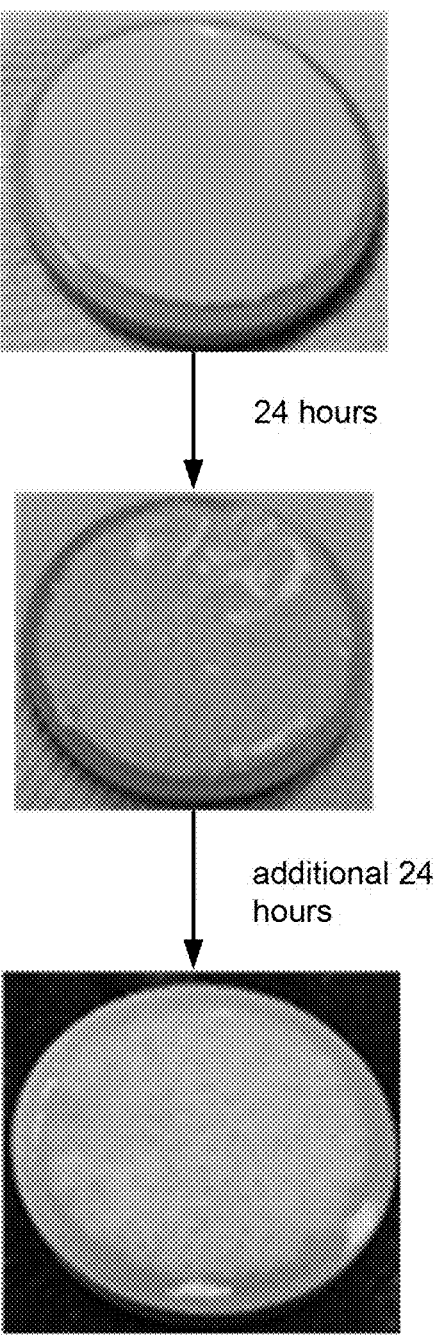
FIG. 3 is a series of images of a filter cake taken initially, then after 24 hours, and then after 48 hours of a soak test using a treatment fluid with a control breaker.
Figure 4:
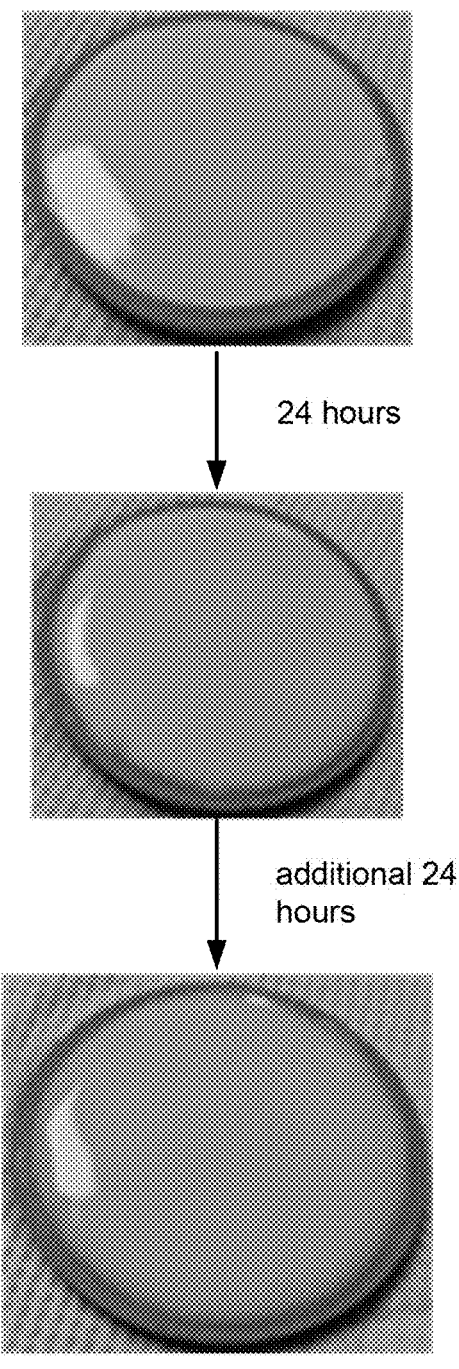
FIG. 4 is a series of images of a filter cake taken initially, then after 24 hours, and then after 48 hours of a soak test using a treatment fluid with a control breaker.
Figure 5:
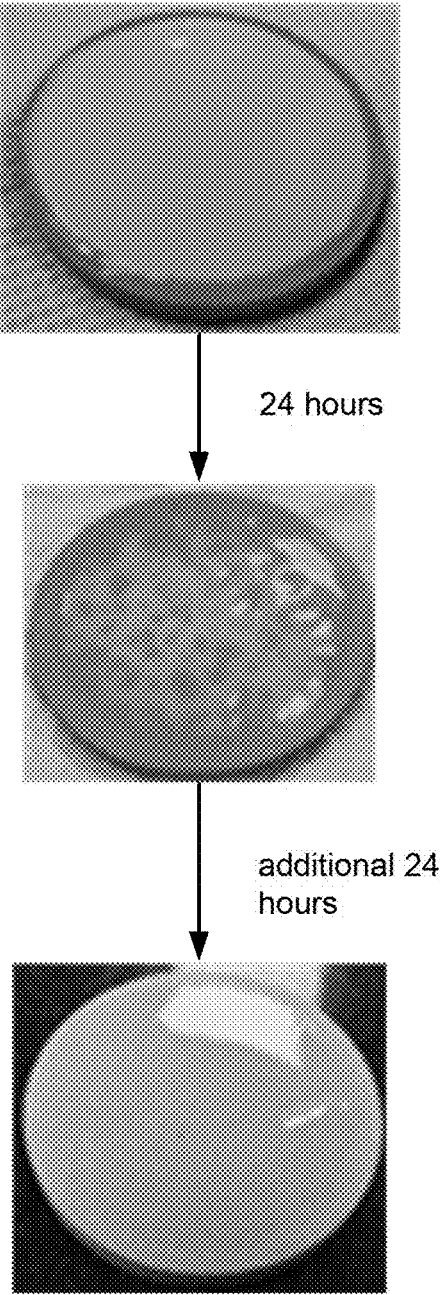
FIG. 5 is a series of images of a filter cake taken initially, then after 24 hours, and the after 48 hours of a soak test using a treatment fluid with a breaker according to one example of the present disclosure.
Figure 6:
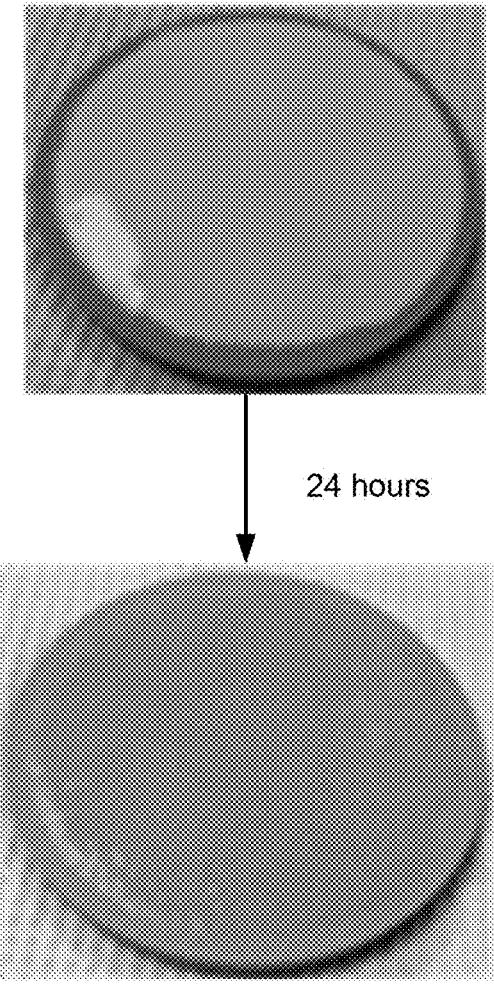
FIG. 6 is a series of images of a filter cake taken initially and then after 24 hours of a soak test using a treatment fluid with a breaker according to one example of the present disclosure.

| | Soak Test at 25° C. in a KCl Brine | | | |
| --- | --- | --- | --- | --- |
| | Breaker 1-1 | Breaker 1-2 | Breaker 1-3 | Breaker 1-4 |
| | Composition | | | |
| 9 ppg KCl brine | 85 mL | 100 mL | 85 mL | 85 mL |
| Diethylene glycol diformate | 15 mL | — | 15 mL | 15 mL |
| Gluconolactone | — | 2 g | 2 g | 4 g |
| Volume of diethylene glycol diformate per 1 kg of gluconolactone | — | — | 7.5 L | 3.75 L |
| | Observations | | | |
| Initial pH | 3.64 | 5.01 | 3.49 | 3.06 |
| pH after 24 hrs | 3.64 | 3.38 | 3.18 | 3.32 |
| pH after 48 hrs | 3.65 | 5.9 | 3.25 | — |
| Filter cake dissolution status | Partial after 48 hrs (FIG. 3) | Partial after 48 hrs (FIG. 4) | Complete after 48 hrs (FIG. 5) | Complete after 24 hrs (FIG. 6) |

As illustrated by Breaker 1-3 and Breaker 1-4 in Table 2, the inclusion of a lower concentration of a lactone compared to the ester-based acid precursor accelerates the dissolution of the filter cake. In comparison, neither the ester-based acid precursor (diethylene glycol diformate) alone nor the lactone (gluconolactone) alone completely dissolves the filter cake after 48 hours.

Further, as illustrated by the pH, the inclusion of the lactone rapidly decreases the pH of the breaker sample, which may hasten the dissolution of the filter cake.

Example 2. Breaker samples according to Table 3 were tested per the soak test at 25° C. where the status of the filter cake was assessed at 24 hours. The pH initially and at the filter cake assessment was recorded. The soak test results are provided in Table 3.

As illustrated by Breaker 2-2, the inclusion of a lower concentration of a lactone compared to the ester-based acid precursor accelerates the dissolution of the filter cake. In comparison, the ester-based acid precursor (diethylene glycol diformate) alone did not completely dissolve the filter cake after 24 hours. Again, the inclusion of the lactone rapidly decreases the pH of the breaker sample.

Further, Examples 1 and 2 illustrate that breaker compositions of the present disclosure are effective in different brine compositions.

Example 3. Breaker samples according to Table 4 were tested per the soak test at 90° C. where the status of the filter cake was assessed at 16 hours. The pH initially and at the filter cake assessment was recorded. The soak test results are provided in Table 4.

TABLE 3

Figure 7:
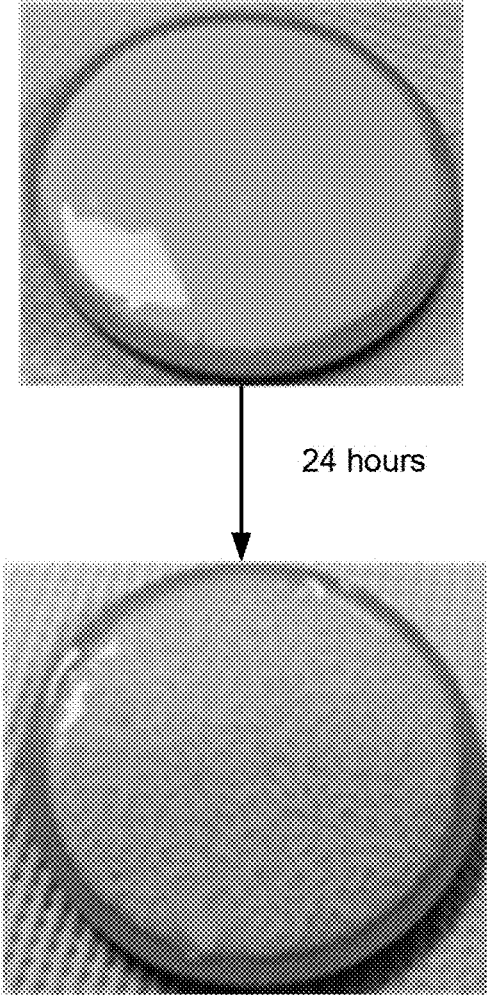
FIG. 7 includes a series of images of a filter cake taken initially and then after 24 hours of a soak test using a treatment fluid with a control breaker.
Figure 8:
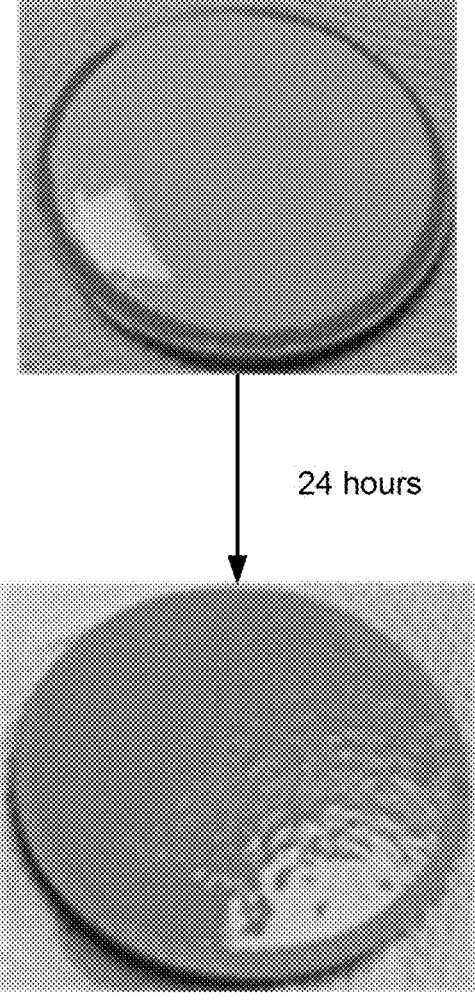
FIG. 8 is a series of images of a filter cake taken initially and then after 24 hours of a soak test using a treatment fluid with a breaker according to one example of the present disclosure.

| | Soak Test at 25° C. in a NaBr Brine | |
| --- | --- | --- |
| | Breaker 2-1 | Breaker 2-2 |
| | Composition | |
| 9 ppg NaBr brine | 85 mL | 85 mL |
| Diethylene glycol diformate | 15 mL | 15 mL |
| Gluconolactone | — | 4 g |
| Volume of diethylene glycol diformate per 1 kg of gluconolactone | — | 3.75 L |
| | Observations | |
| Initial pH | 4.42 | 3.68 |
| pH after 24 hrs | 3.51 | 3.43 |
| Filter cake dissolution status | Partial after 24 hrs (FIG. 7) | Complete after 24 hrs (FIG. 8) |

Table 4—Soak Test at 90° C. in a NaBr Brine

TABLE 4

Figure 9:
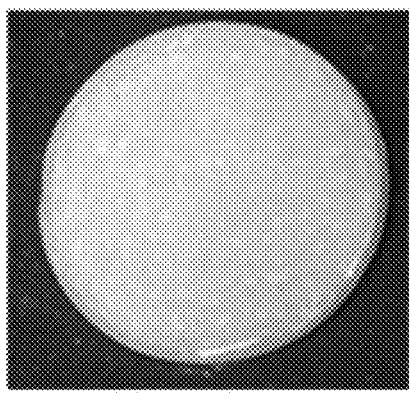
FIG. 9 is an image of a filter cake taken after 16 hours of a soak test using a treatment fluid with a control breaker.
Figure 10:
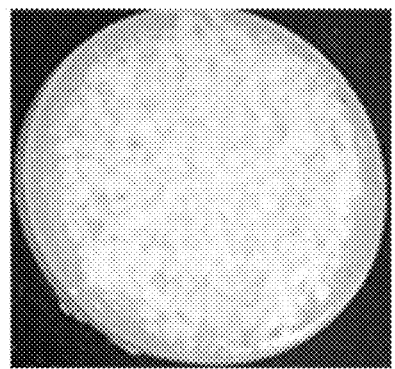
FIG. 10 is an image of a filter cake taken after 16 hours of a soak test using a treatment fluid with a control breaker.
Figure 11:
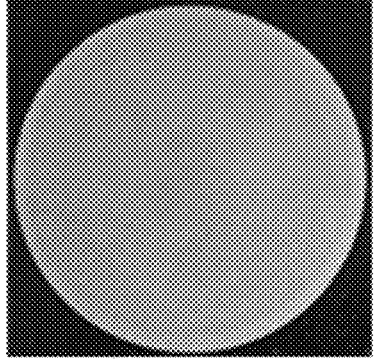
FIG. 11 is an image of a filter cake taken after 16 hours of a soak test using a treatment fluid with a breaker according to one example of the present disclosure.

| Soak Test at 90° C. in a NaBr Brine | | | |
| --- | --- | --- | --- |
| | Breaker 3-1 | Breaker 3-2 | Breaker 3-3 |
| Composition | | | |
| 11 ppg NaBr brine | 80 mL | 100 mL | 80 mL |
| Methyl lactate | 20 mL | — | 20 mL |
| Gluconolactone | — | 5 g | 5 g |
| Volume of methyl lactate per 1 kg of gluconolactone | — | — | 4 L |
| Observations | | | |
| Initial pH | 3.11 | 3.31 | 3.02 |
| pH after 16 hrs | 4.06 | 2.3 | 2.58 |
| Filter cake dissolution status | Partial after 16 hrs (FIG. 9) | Partial after 16 hrs (FIG. 10) | Complete after 16 hrs (FIG. 11) |

As illustrated by Breaker 3-3, the inclusion of a lower concentration of a lactone compared to the ester-based acid precursor accelerates the dissolution of the filter cake. In comparison, neither the ester-based acid precursor (methyl lactate) alone nor the lactone (gluconolactone) alone completely dissolves the filter cake after 16 hours. Again, the inclusion of the lactone rapidly decreases the pH of the breaker sample.

Further, Examples 1 and 2 illustrate that breaker compositions of the present disclosure are effective in different brine compositions.

Example 4. Breaker samples according to Table 5 were tested per the soak test at 90° C. where the status of the filter cake was assessed at 16 hours. The pH initially and at the filter cake assessment was recorded. The soak test results are provided in Table 5.

TABLE 5

Figure 12:
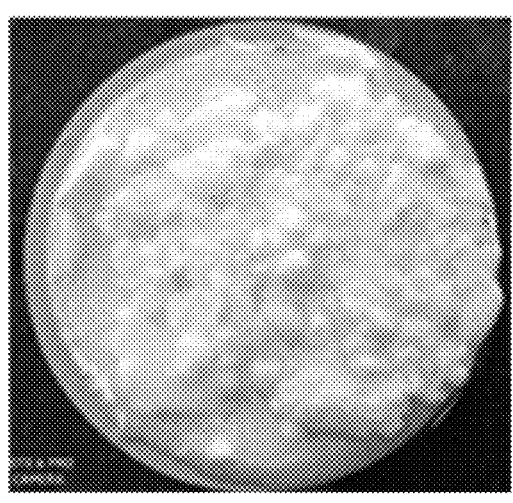
FIG. 12 is an image of a filter cake taken after 16 hours of a soak test using a treatment fluid with a control breaker.
Figure 13:
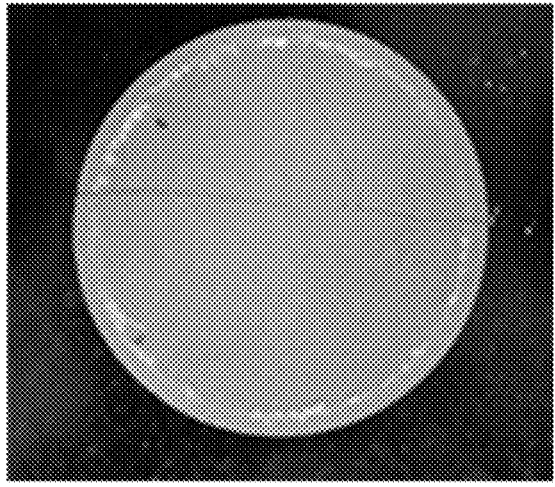
FIG. 13 is an image of a filter cake taken after 16 hours of a soak test using a treatment fluid with a breaker according to one example of the present disclosure.

| Soak Test at 90° C. in a NaCl Brine | | |
| --- | --- | --- |
| | Breaker 4-1 | Breaker 4-2 |
| Composition | | |
| 10 ppg NaCl brine | 80 mL | 80 mL |
| Ethyl lactate | 20 mL | 20 mL |
| Gluconolactone | — | 5 g |
| Volume of ethyl lactate per 1 kg of gluconolactone | — | 4 L |
| Observations | | |
| Initial pH | 3.12 | 3.06 |
| pH after 16 hrs | 4.12 | 2.48 |
| Filter cake dissolution status | Partial after 16 hrs FIG. 12 | Complete after 16 hrs FIG. 13 |

As illustrated by Breaker 4-2, the inclusion of a lower concentration of a lactone compared to the ester-based acid precursor accelerates the dissolution of the filter cake. In comparison, the ester-based acid precursor (ethyl lactate) alone did not completely dissolve the filter cake after 16 hours. Again, the inclusion of the lactone rapidly decreases the pH of the breaker sample.

Further, Examples 3 and 4 illustrate that breaker compositions of the present disclosure are effective in different brine compositions.

Example 5. Breaker samples according to Table 6 were tested per the breakthrough test at 90° C. The pH at breakthrough was recorded. The breakthrough test results are provided in Table 6.

TABLE 6

| Breakthrough Test at 90° C. in a NaBr Brine | | |
| --- | --- | --- |
| | Breaker 5-1 | Breaker 5-2 |
| Composition | | |
| 11 ppg NaBr brine | 80 mL | 80 mL |
| Methyl lactate | 20 mL | 20 mL |
| Gluconolactone | — | 10 g |
| Volume of methyl lactate per 1 kg of gluconolactone | — | 2 L |
| Observations | | |
| pH after breakthrough | 2.2 | 1.99 |
| Breakthrough time | 44 hrs | 5 hrs |

As illustrated by Breaker 5-2, the inclusion of a lower concentration of a lactone compared to the ester-based acid precursor accelerates the breakthrough of the filter cake. In comparison, the ester-based acid precursor (methyl lactate) alone took almost 9 times longer to breakthrough the filter cake.

Further, Examples 3 and 4 illustrate that breaker compositions of the present disclosure are effective in different brine compositions.

Example 6. Breaker samples according to Table 7 were tested per the breakthrough test at 90° C. The pH initially and at breakthrough was recorded. The breakthrough test results are provided in Table 7.

TABLE 7

| Breakthrough Test at 90° C. in a NaCl Brine | | |
| --- | --- | --- |
| | Breaker 6-1 | Breaker 6-2 |
| Composition | | |
| 10 ppg NaCl brine | 80 mL | 80 mL |
| Ethyl lactate | 20 mL | 20 mL |

TABLE 7-continued

| Breakthrough Test at 90° C. in a NaCl Brine | | |
| --- | --- | --- |
| | Breaker 6-1 | Breaker 6-2 |
| Gluconolactone | — | 5 g |
| Volume of ethyl lactate per 1 kg of gluconolactone | — | 4 L |
| Observations | | |
| Initial pH | 3.15 | 3.26 |
| pH after breakthrough | 3.45 (at 72 hrs) | 2.58 |
| Breakthrough time | No breakthrough at 72 hrs | 16 hrs |

As illustrated by Breaker 6-2, the inclusion of a lower concentration of a lactone compared to the ester-based acid precursor accelerates the breakthrough of the filter cake. In comparison, the ester-based acid precursor (ethyl lactate) alone did not breakthrough the filter cake at 72 hours, which is 4.5 times longer exposure than Breaker 6-2.

Further, Examples 5 and 6 illustrate that breaker compositions of the present disclosure are effective in different brine compositions.

In some aspects, materials, methods, and systems for at least partially removing filter cakes are provided according to one or more of the following examples. As used below, any reference to a series of examples is to be understood as a reference to each of those examples disjunctively (e.g., "Examples 1-4" is to be understood as "Examples 1, 2, 3, or 4").

Example 1 is a method comprising: introducing a treatment fluid into a wellbore having a filter cake therein, the treatment fluid comprising an aqueous fluid and a breaker that comprises an ester-based acid precursor and a lactone, wherein a volume of the ester-based acid precursor per 1 kg of lactone is about 2 L to about 20 L; contacting the filter cake with the treatment fluid; and removing at least a portion of the filter cake.

Example 2 is the method of example 1, wherein a rate of hydrolysis for the ester-based acid precursor is increased by at least about 5 times (e.g., about 5 times to about 50 times) the rate of hydrolysis for the ester-based acid precursor observed in an absence of the lactone at a temperature in which the treatment fluid contacts the filter cake.

Example 3 is the method of example 1, wherein a rate of hydrolysis for the ester-based acid precursor is increased by at least about 5 times (e.g., about 5 times to about 50 times) the rate of hydrolysis for the ester-based acid precursor observed in an absence of the lactone at about 15° C., about 25° C., about 35° C., about 45° C., about 55° C., about 65° C., about 75° C., about 85° C., about 95° C., about 105° C., or about 120° C.

Example 4 is the method of any one of examples 1-3, wherein a volume of the ester-based acid precursor per 1 kg of lactone is about 5 L to about 20 L.

Example 5 is the method of any one of examples 1-4, wherein a volume of the ester-based acid precursor per 1 kg of lactone is about 10 L to about 20 L.

Example 6 is the method of any one of examples 1-5, wherein the contacting occurs at a temperature of about 15° C. to about 120° C.

Example 7 is the method of any one of examples 1-6, wherein the contacting occurs at a temperature of is about 15° C. to about 35° C.

Example 8 is the method of any one of examples 1-6, wherein the contacting occurs at a temperature of is about 25° C. to about 60° C.

Example 9 is the method of any one of examples 1-6, wherein the contacting occurs at a temperature of is about 50° C. to about 100° C.

Example 10 is the method of any one of examples 1-6, wherein the contacting occurs at a temperature of is about 70° C. to about 120° C.

Example 11 is the method of any one of examples 1-10, further comprising: adding the lactone to a mixture that includes the aqueous fluid and ester-based acid precursor to produce the treatment fluid while the treatment fluid is being introduced into the wellbore.

Example 12 is the method of any one of examples 1-11, wherein the lactone is present in an amount of from about 0.005 kg/L to about 0.2 kg/L based on a total volume of the treatment fluid.

Example 13 is the method of any one of examples 1-12, wherein the lactone is present in an amount of from about 0.005 v to about 0.1 kg/L based on a total volume of treatment fluid.

Example 14 is the method of any one of examples 1-13, wherein the lactone is present in an amount of from about 0.005 kg/L to about 0.05 kg/L based on a total volume of the treatment fluid.

Example 15 is the method of any one of examples 1-14, wherein the lactone comprises gluconolactone, glucoheptonic lactone, α-acetolactone, β-propiolactone, γ-butyrolactone, δ-valerolactone, ε-caprolactone, γ-decalactone, δ-decalactone, γ-dodecalactone, γ-octalactone, γ-nonalactone, γ-undecalactone, ellagic acid, flavogallonic acid dilactone, tergallic acid dilactone, valoneic acid dilactone, ethylene brassylate, or any combination thereof.

Example 16 is the method of any one of examples 1-15, wherein the ester-based acid precursor comprises lactide, glyceryl diacetate, glyceryl triacetate, ethylene glycol monoformate, monoethylene glycol diformate, diethylene glycol diformate, glyceryl monoformate, glyceryl diformate, glyceryl triformate, triethylene glycol diformate, a ester of pentaerythritol, methyl lactate, ethyl lactate, propyl lactate, butyl lactate, polylactic acid, or any combination thereof.

Example 17 is a system for performing the method of any one of examples 1-16, the system comprising: a tubular disposed in the subterranean formation; and a pump configured to pump the composition in the subterranean formation through the tubular.

Example 18 is a method comprising: introducing a treatment fluid into a wellbore having a filter cake therein, the treatment fluid comprising an aqueous fluid and a breaker that comprises an ester-based acid precursor and a lactone, wherein a volume of the ester-based acid precursor per 1 kg of lactone is about 5 L to about 20 L, and wherein the lactone is present in an amount of from about 0.005 kg/L to about 0.15 kg/L based on a total volume of the treatment fluid; contacting the filter cake with the treatment fluid; and removing at least a portion of the filter cake.

Example 19 is the method of example 18, wherein a rate of hydrolysis for the ester-based acid precursor is increased by at least about 5 times (e.g., about 5 times to about 50 times) the rate of hydrolysis for the ester-based acid precursor observed in an absence of the lactone at a temperature in which the treatment fluid contacts the filter cake.

Example 20 is the method of example 18, wherein a rate of hydrolysis for the ester-based acid precursor is increased by at least about 5 times (e.g., about 5 times to about 50 times) the rate of hydrolysis for the ester-based acid precursor observed in an absence of the lactone at about 15° C., about 25° C., about 35° C., about 45° C., about 55° C., about 65° C., about 75° C., about 85° C., about 95° C., about 105° C., or about 120° C.

Example 21 is the method of any one of examples 18-20, wherein a volume of the ester-based acid precursor per 1 kg of lactone is about 10 L to about 20 L.

Example 22 is the method of any one of examples 18-21, wherein the contacting occurs at a temperature of about 15° C. to about 120° C.

Example 23 is the method of any one of examples 18-22, wherein the contacting occurs at a temperature of is about 15° C. to about 35° C.

Example 24 is the method of any one of examples 18-22, wherein the contacting occurs at a temperature of is about 25° C. to about 60° C.

Example 25 is the method of any one of examples 18-22, wherein the contacting occurs at a temperature of is about 50° C. to about 100° C.

Example 26 is the method of any one of examples 18-22, wherein the contacting occurs at a temperature of is about 70° C. to about 120° C.

Example 27 is the method of any one of examples 18-26, further comprising: adding the lactone to a mixture that includes the aqueous fluid and ester-based acid precursor to produce the treatment fluid while the treatment fluid is being introduced into the wellbore.

Example 28 is the method of any one of examples 18-27, wherein the lactone is present in an amount of from about 0.005 kg/L to about 0.1 kg/L based on a total volume of the treatment fluid.

Example 29 is the method of any one of examples 18-28, wherein the lactone is present in an amount of from about 0.005 kg/L to about 0.05 kg/L based on a total volume of the treatment fluid.

Example 30 is the method of any one of examples 18-29, wherein the lactone comprises gluconolactone, glucoheptonic lactone, α-acetolactone, β-propiolactone, γ-butyrolactone, δ-valerolactone, ε-caprolactone, γ-decalactone, δ-decalactone, γ-dodecalactone, γ-octalactone, γ-nonalactone, γ-undecalactone, ellagic acid, flavogallonic acid dilactone, tergallic acid dilactone, valoneic acid dilactone, ethylene brassylate, or any combination thereof.

Example 31 is the method of any one of examples 18-30, wherein the ester-based acid precursor comprises lactide, glyceryl diacetate, glyceryl triacetate, ethylene glycol monoformate, monoethylene glycol diformate, diethylene glycol diformate, glyceryl monoformate, glyceryl diformate, glyceryl triformate, triethylene glycol diformate, a ester of pentaerythritol, methyl lactate, ethyl lactate, propyl lactate, butyl lactate, polylactic acid, or any combination thereof.

Example 32 is a treatment fluid comprising: an aqueous fluid; and a breaker that comprises an ester-based acid precursor and a lactone, wherein a volume of the ester-based acid precursor per 1 kg of lactone is about 2 L to about 20 L.

Example 33 is the treatment fluid of example 32, wherein the volume of the ester-based acid precursor per 1 kg of lactone is about 5 L to about 20 L.

Example 34 is the treatment fluid of any one of examples 32-33, wherein the volume of the ester-based acid precursor per 1 kg of lactone is about 10 L to about 20 L.

Example 35 is the treatment fluid of any one of examples 32-34, wherein the lactone is present in an amount of from about 0.005 kg/L to about 0.2 kg/L based on a total volume of the treatment fluid.

Example 36 is the treatment fluid of any one of examples 32-35, wherein the lactone is present in an amount of from about 0.005 kg/L to about 0.1 kg/L based on a total volume of the treatment fluid.

Example 37 is the treatment fluid of any one of examples 32-36, wherein the lactone is present in an amount of from about 0.005 kg/L to about 0.05 kg/L based on a total volume of the treatment fluid.

Example 38 is the treatment fluid of any one of examples 32-37, wherein the lactone comprises gluconolactone, glucoheptonic lactone, α-acetolactone, β-propiolactone, γ-butyrolactone, δ-valerolactone, ε-caprolactone, γ-decalactone, δ-decalactone, γ-dodecalactone, γ-octalactone, γ-nonalactone, γ-undecalactone, ellagic acid, flavogallonic acid dilactone, tergallic acid dilactone, valoneic acid dilactone, ethylene brassylate, or any combination thereof.

Example 39 is the treatment fluid of any one of examples 32-38, wherein the ester-based acid precursor comprises lactide, glyceryl diacetate, glyceryl triacetate, ethylene glycol monoformate, monoethylene glycol diformate, diethylene glycol diformate, glyceryl monoformate, glyceryl diformate, glyceryl triformate, triethylene glycol diformate, a formate ester of pentaerythritol, methyl lactate, ethyl lactate, propyl lactate, butyl lactate, polylactic acid, or any combination thereof.

Example 40 is the treatment fluid of any one of examples 32-39, wherein the aqueous fluid is a brine.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
introducing a treatment fluid into a wellbore having a filter cake therein, the treatment fluid comprising an aqueous fluid and a breaker that comprises an ester-based acid precursor and a lactone, wherein a volume of the ester-based acid precursor per 1 kg of lactone is about 2 L to about 20 L, wherein the lactone is an organic heterocyclic compound that consist of a cyclic carboxylic ester and one or more heteroatoms replacing carbon atoms in a ring of the cyclic carboxylic ester;
contacting the filter cake with the treatment fluid; and
removing at least a portion of the filter cake.

2. The method of claim 1, wherein a rate of hydrolysis for the ester-based acid precursor is increased by at least about 5 times the rate of hydrolysis for the ester-based acid precursor observed in an absence of the lactone at a temperature in which the treatment fluid contacts the filter cake.

3. The method of claim 1, wherein the volume of the ester-based acid precursor per 1 kg of lactone is about 5 L to about 20 L.

4. The method of claim 1, wherein the contacting occurs at a temperature of about 15° C. to about 120° C.

5. The method of claim 1, wherein the contacting occurs at a temperature of is about 15° C. to about 35° C.

6. The method of claim 1, further comprising: adding the lactone to a mixture that includes the aqueous fluid and ester-based acid precursor to produce the treatment fluid while the treatment fluid is being introduced into the wellbore.

7. The method of claim 1, wherein the lactone is present in an amount of from about 0.005 kg/L to about 0.2 kg/L based on a total volume of the treatment fluid.

8. The method of claim 1, wherein the lactone is present in an amount of from about 0.005 kg/L to about 0.1 kg/L based on a total volume of the treatment fluid.

9. The method of claim 1, wherein the lactone comprises gluconolactone, glucoheptonic lactone, α-acetolactone, β-propiolactone, γ-butyrolactone, δ-valerolactone, ε-caprolactone, γ-decalactone, δ-decalactone, γ-dodecalactone, γ-octalactone, γ-nonalactone, γ-undecalactone, ellagic acid, flavogallonic acid dilactone, tergallic acid dilactone, valoneic acid dilactone, ethylene brassylate, or any combination thereof.

10. The method of claim 1, wherein the ester-based acid precursor comprises lactide, glyceryl diacetate, glyceryl triacetate, ethylene glycol monoformate, monoethylene glycol diformate, diethylene glycol diformate, glyceryl monoformate, glyceryl diformate, glyceryl triformate, triethylene glycol diformate, a ester of pentaerythritol, methyl lactate, ethyl lactate, propyl lactate, butyl lactate, pelylactic acid, or any combination thereof.

11. A system for performing the method of claim 1, the system comprising: a tubular disposed in the wellbore; and a pump configured to pump the treatment fluid into the wellbore through the tubular.

12. A method comprising:

introducing a treatment fluid into a wellbore having a filter cake therein, the treatment fluid comprising an aqueous fluid and a breaker that comprises an ester-based acid precursor and a lactone, wherein the lactone is an organic heterocyclic compound that consist of a cyclic carboxylic ester and one or more heteroatoms replacing carbon atoms in a ring of the cyclic carboxylic ester, wherein a volume of the ester-based acid precursor per 1 kg of lactone is about 5 L to about 20 L, and wherein the lactone is present in an amount of from about 0.005 kg/L to about 0.15 kg/L based on a total volume of the treatment fluid;

contacting the filter cake with the treatment fluid; and removing at least a portion of the filter cake.

13. The method of claim 12, wherein a rate of hydrolysis for the ester-based acid precursor is increased by at least about 5 times the rate of hydrolysis for the ester-based acid precursor observed in an absence of the lactone.

14. The method of claim 12, wherein the contacting occurs at a temperature of about 15° C. to about 120° C.

\* \* \* \* \*